3,266,985
PRODUCTION OF WOOD PRESERVATIVES
Danvers Allin Swales, Harrogate, England, assignor to Associated Chemical Companies Limited, Harrogate, England, a British company
No drawing. Filed Apr. 15, 1965, Ser. No. 448,267
Claims priority, application Great Britain, Apr. 24, 1964, 17,105/64
12 Claims. (Cl. 167—38.5)

Wood preservatives containing copper or zinc and chromium in the form of chromium trioxide (chromic acid) or a compound thereof are well known. Compositions containing copper are usually more effective than those containing zinc. Normally the copper or zinc is introduced into the composition as the sulphate, and the chromium as an alkali metal dichromate. These preservatives are used as aqueous solutions, and when the solution is made reaction takes place to yield in effect copper or zinc dichromate.

It is established that the best results are obtained in the treatment of wood when the copper and chromium react within the wood in the proportion of one atom of copper to two atoms of chromium, that is to say in the proportions in which they are present in copper dichromate. In many compositions there is excess of either copper or chromium over these proportions, but the ideal is to be at or very close to the 1:2 ratio.

It is extremely desirable to supply the compositions as free-flowing powders which can be dissolved in water when they are used. If, however, the most common constituents, namely copper sulphate in the form of its pentahydrate and sodium dichromate or anhydrous sodium dichromate, are mixed, difficulties arise, particularly in storage. There is a tendency to segregation of the ingredients, so that the powder on being poured out of its container is not of uniform composition. As the whole charge in a container is rarely used to make a single batch of solution for use, this segregation is a very serious drawback. Moreover, in the presence of moisture the dichromate deliquesces so that an initially dry and free-flowing mixture of the components may soon become pasty and liquid when exposed to the atmosphere. The initially dry mixture is not even stable on storage in air-tight containers, because the water of crystallisation associated with the copper sulphate tends to be transferred to the sodium dichromate at slightly elevated temperatures with subsequent deliquescence.

Some improvement can be effected by the use of the more expensive potassium dichromate instead of sodium dichromate dihydrate or anhydrous sodium dichromate as the chromium component of the mixture; however if other deliquescent substances, such as arsenic pentoxide, are present in the composition, not even the use of the potassium salts will prevent transference of water from copper sulphate pentahydrate to the arsenic pentoxide. The tendency to segregation remains.

In order to reduce or eliminate deliquescence the copper or zinc sulphates have been dried from the pentahydrate or heptahydrate respectively to lower hydrates so as to deprive them of water of crystallisation which can migrate. This remedy, however, does not remove the drawback of segregation.

The invention is based on the discovery that if copper sulphate and sodium dichromate are reacted in the presence of water, and the water is subsequently evaporated off, a product is formed which is not copper dichromate. It is not certain what its precise composition is, but free chromic acid is formed, together with copper chromates or complex copper and chromium-containing compounds in an intimate mixture. The product is not subject to segregation and is stable in closed containers even in admixture with arsenic pentoxide.

It is an object of the invention therefore to provide wood preservative compositions which are stable in closed containers, even in admixture with deliquescent substances. It is a further object of the invention to provide compositions which are free or substantially free from any tendency to segregation.

It is a still further object of the invention to provide particular compositions which are substantially or wholly non-deliquescent, in the presence of normal atmospheric conditions.

These and other objects of the invention will become apparent from the following description of the invention.

The essence of the invention thus is the reaction of a copper salt and chromic acid or an alkali metal dichromate, with or without other compounds, in the presence of water, with subsequent evaporation of the water to leave a dry residue. This residue is a homogeneous free-flowing powder, free or substantially free from any tendency to segregation, and is stable in closed containers.

Ideally, the compositions should contain copper and chromium in the same proportions as those present in copper dichromate. In practice manufacturing tolerances are always permitted, but I prefer not to allow either copper and chromium to be in excess of the other by more than 10%. It will be understood that any excess of either copper or chromium over the 1:2 atomic ratio will be considered as being another constituent of the powder, even though it will almost certainly participate in the complex reactions taking place and is thus unlikely to exist in the free-flowing powder in the form in which it was added. The wood preservatives according to the invention have two further advantages over known materials. Firstly sodium dichromate can be used in the preparation of the free-flowing powders which are stable in closed containers, and this salt is cheaper than potassium dichromate. Secondly, the preservatives may be prepared from a solution of sodium dichromate, and not necessarily from the pure crystalline material; since sodium dichromate is first prepared in the form of a solution during its manufacture from chrome ore, this means the saving of a manufacturing step.

Zinc salts are also of value in the formation of wood preservatives, although they are not as effective as copper salts. In a modification of the invention, all or part of the copper salt used in the preparation of the free-flowing powder is replaced by an equivalent amount of a zinc salt, one atom of zinc for one atom of copper, and the total of copper dichromate plus zinc dichromate, or of zinc dichromate alone should then constitute the main constituent of the preservative.

Preferably the compositions are made from approximately equivalent amounts of copper sulphate and sodium dichromate. However, aqueous solutions of copper dichromate, and mixtures of copper chromate and chromic acid solution, when dried, give very similar deliquescent products which are homogeneous and resist segregation, and which are stable in closed containers even in the presence of arsenic pentoxide.

The powders produced according to the invention will readily dissolve in water provided that the pH of the solution is less than 3.0. This low pH can be obtained either by the inclusion of an acidic component in the solution that is evaporated or by the addition of such a component to the powder or to the water in which the powder is dissolved. Naturally it is preferable to provide a composition which merely requires water for solution, so it is advantageous to incorporate an acidic material such as $As_2O_5 \cdot 2H_2O$ or $KHSO_4$ either during the preparation of the composition or by dry mixing afterwards. If dry mixing is used the composition is liable to segregate, and it is therefore preferable to incorporate the acidic material into the reaction mixture to be dried.

Although powders that are non-deliquescent so long as they are not exposed to moisture can be placed in airtight containers and will still be free-flowing when the container is opened, it is obviously desirable that the compositions should be non-deliquescent. It will then remain free-flowing even after its container has been opened. I have found that this desirable result can be obtained by incorporating a potassium or ammonium salt such as chloride or sulphate in the reaction mixture from which the water is later evaporated. The resultant powders, instead of being deliquescent under normal atmospheric conditions, pick up moisture only very slowly and deliquesce very little, if at all.

I believe that the free chromic acid dispersed throughout the copper chromate or throughout the copper-chromium compounds present forms a complex with the potassium or ammonium salt which is stable and non-deliquescent. This complex, probably in the form of tri- or tetra chromates in which some of the chromium has been replaced by another anion, gives a pH in solution between that of a solution of chromic acid and that of a solution of sodium dichromate; it can probably be expressed in the form (for example using potassium sulphate) as $K_2O.SO_3(CrO_3)_{1-2}$. It is possible to adjust the compositions so that, while the desirable properties of stability and non-deliquescence are maintained, the final product incorporates an acidic component and will dissolve in water without the addition of any other acid or acid material to give a solution of pH 3 or less.

In theory to obtain a non-deliquescent product an amount of a potassium or ammonium salt should be added to the reaction mixture which will just react with the free dispersed chromic acid; however it is found in practice that it is preferable to add an excess of the potassium or ammonium salt to ensure complete reaction. While an addition of the theoretical quantity gives an acceptable product, that is to say one atom of potassium or one ammonium ion for each free atom of chromium, it is advantageous to add twice this amount, for example one gram molecular weight of potassium sulphate for each gram-molecular weight of free chromic acid.

The wood-preservative compositions according to the invention may contain other compounds as desired, for example, sodium hydrogen fluoride or dinitrophenol. The proportions of such other compounds must be such that the copper or zinc dichromate (or both) assumed to be present in the composition is the main constituent. Where possible, such other compounds should be added to the reaction mixture before drying to ensure that the composition is not prone to segregation; if this is not possible, they may be mixed in mechanically at a later stage.

Some examples will now be given.

*Example 1*

A copper-chromium composition was made up as follows:

To 40 g. of $Na_2Cr_2O_7.2H_2O$ in the form of a hot 84% w./w. solution was added 32 g. ground $CuSO_4.5H_2O$. The slurry formed was thoroughly mixed and allowed to react, and the water was then evaporated off with stirring. The dried product was a dark reddish-brown powder.

This composition was quite stable and showed no signs of caking when stored in a closed container at room temperature or at 50° C. However, when exposed to normal laboratory atmospheric conditions it deliquesced. In admixture with dried $As_2O_5.2H_2O$ it gave a free-flowing powder which was stable in a closed container at room temperature and at 50° C. with no signs of moisture transference or caking.

When added to water held at from 35 to 40° C. in sufficient quantity to give a 2% w./v. solution, the powder was fully dissolved when the pH of the solution was adjusted to 2.5 by the addition of sulphuric acid.

*Example 2*

A copper-chromium composition was made up using the method of Example 1 from 200 g. of $Na_2Cr_2O_7.2H_2O$ as a hot 84% w./w. solution, 100 g. of ground KCl and 160 g. ground $CuSO_4.5H_2O$. The dried product was a yellow-brown powder.

This composition was quite stable and showed no signs of caking when stored in a closed container at room temperature or at 50° C. When exposed to normal laboratory atmospheric conditions it showed no signs of caking; exposure at 20° C. to air at 65% relative humidity for 100 hours resulted in a pick-up of only about 0.5% by weight of water. In admixture with dried $As_2O_5.2H_2O$ it gave a free-flowing powder which was stable in a closed container at room temperature and at 50° C., with no signs of moisture transference or caking.

When added to water held at from 35 to 40° C. and in sufficient quantity to give a 2% w./v. solution, the powder was fully dissolved when the pH of the solution was adjusted to 2.5 with sulphuric acid.

*Example 3*

A composition was made up using the method of Example 1 from 200 g. $Na_2Cr_2O_7.2H_2O$, as a hot 84% w./w. solution, 117 g. ground $K_2SO_4$ and 160 g. ground $CuSO_4.5H_2O$. The dried product was very similar to that of Example 2.

*Example 4*

A composition was made up using the method of Example 1 from 40 g. $Na_2Cr_2O_7.2H_2O$, as a hot 84% w./w. solution, 11.7 g. ground $K_2SO_4$ and 32 g. ground $CuSO_4.5H_2O$. The dried product was a light-brown powder and was similar to that prepared in Example 2. Exposure at 20° C. to air at 65% relative humidity for 100 hours resulted in a pick-up of about 4.2% by weight of water.

*Example 5*

A composition was made up using the method of Example 1 from 40 g. $Na_2Cr_2O_7.2H_2O$, as a hot 84% w./w. solution, 5.9 g. ground $K_2SO_4$ and 32 g. ground $$CuSO_4.5H_2O$$

The dried product was a brown powder.

This composition was similar to that of Example 2 except that it showed signs of caking when exposed to normal laboratory atmospheric conditions. Exposure at 20° C. to air at 65% relative humidity for 100 hours, resulted in a pick-up of about 12% by weight of water which was just sufficient to cause some congealing. (By way of comparison, a mixture of $CuSO_4.5H_2O$ with anhydrous sodium dichromate exposed in the same way, picked up a similar amount of water in 100 hours but congealed within 70 hours.)

*Example 6*

A composition was made up using the method of Example 1 from 40 g. $Na_2Cr_2O_7.2H_2O$ as a hot 84% w./w. solution, 3.4 g. $CrO_3$, 12.0 g. ground $K_2SO_4$, and 36.2 g. $CuSO_4.5H_2O$. The dried product was a light-brown powder.

This composition was similar to that of Example 4, except that when added to water held at from 35 to 40° C. in sufficient quantity to give a 2% w./v. solution, the powder fully dissolved giving a solution with a pH value of 2.6. Exposure at 20° C. to air at 65% relative humidity for 100 hours resulted in a pick-up of about 5% by weight of water.

*Example 7*

A composition was made up using the method of Example 1 from 40 g. $Na_2Cr_2O_7.2H_2O$, as a hot 84% w./w. solution, 8.9 g. ground $(NH)_2SO_4$ and 32 g. ground $CuSO_4.5H_2O$. The dried product was a light-brown powder and was similar to that prepared in Example 4, except that it picked up about 3.4% by weight of water after exposure at 20° C. to air at 65% relative humidity for 100 hours.

*Example 8*

100 g. $CrO_3$ was dissolved in 150 ml. water and reacted with 59 g. basic copper carbonate. To the resultant slurry was added 43.5 g. ground $K_2SO_4$ and the mixture reacted and dried as in the previous examples. The dried product was a brown powder which was similar to that prepared in Example 4, except that it picked up about 5.0% by weight of water after exposure at 20° C. to air at 65% relative humidity for 100 hours.

*Example 9*

A composition was made up from 100 g. $CrO_3$, 100 g. water, 125 g. ground $CuSO_4.5H_2O$ and 174 g. $K_2SO_4$. The dried product was a reddish-brown powder which was similar to that prepared in Example 4, except that the powder dissolved completely in water giving a pH value of 1.7. Exposure to air at 65% relative humidity for 100 hours resulted in a pick-up of about 6% by weight of water and the product remained free-flowing.

*Example 10*

A composition was made up as described in the previous examples by reacting 40 g. $Na_2Cr_2O_7.2H_2O$ as a hot 84% w./w. solution, 23.4 g. ground $K_2SO_4$ and 38 g. $ZnSO_4$. The dried product was a yellow powder which was similar to that prepared in Example 2, except that it picked up about 4% by weight of water after exposure at 20° C. to air at 65% relative humidity for 100 hours.

I claim:

1. A process for preparing a material for use in wood preservative compositions comprising, reacting in the presence of water, a compound selected from the group consisting of chromic acid and alkali metal dichromate, and a salt of a metal selected from the group consisting of copper and zinc, followed by evaporation of the water to leave the solid reaction products as a free flowing powder.

2. A process according to claim 1 where the reactants are proportioned so as to give a product containing chromium and said metal in the same proportions as are present in the dichromate of said metal.

3. A process according to claim 1 where the reactants are proportioned to give a product containing chromium and said metal in which there is a 10% excess of said metal over the proportion present in the dichromate of said metal.

4. A process according to claim 1 where the reactants are proportioned to give a product containing chromium and said metal in which there is up to a 10% excess of chromium over the proportion present in the dichromate of said metal.

5. A process according to claim 1 including the step of mixing an acidic material in the aqueous reaction mixture.

6. A process according to claim 1 including the step of mixing an acidic material with the free flowing powder.

7. A process according to claim 1 in which a salt of a cation selected from the group consisting of potassium and ammonium is incorporated in the reaction mixture with the metal and chromium in the presence of water.

8. A process for preparing a material for use in wood preservative compositions comprising reacting in the presence of water sodium dichromate and the sulfate of a metal selected from the group consisting of copper and zinc, and evaporating said water to leave the solid reaction products as a free flowing powder.

9. A process for preparing a material for use in wood preservative compositions comprising reacting in the presence of water, copper sulfate and sodium dichromate with a salt of a cation selected from the group consisting of potassium and ammonium in proportions such that there is about one atom of copper to every two atoms of chromium and about two of said cations to each free atom of chromium present in the composition as dispersed chromic acid, and evaporating the water from the reaction mixture to leave the solid reaction products as a free flowing powder.

10. A product produced in accordance with the method of claim 1.

11. A product produced in accordance with the method of claim 8.

12. A product produced in accordance with the method of claim 9.

References Cited by the Examiner

UNITED STATES PATENTS 2,852,428 9/1958 Cook _____ 167—38.5
3,094,459 1/1963 Pickren _____ 167—42

JULIAN S. LEVITT, *Primary Examiner.*

S. J. FRIEDMAN, *Assistant Examiner.*